United States Patent

[11] 3,592,417

| | | | | | |
|---|---|---|---|---|---|
| [72] | Inventor | Arthur Simon<br>Fairlawn, N.J. | 2,979,289 | 4/1961 | Abzug .................... 244/77 (B) |
| [21] | Appl. No. | 834,701 | 3,053,487 | 9/1962 | Baldwin et al. ............... 244/77 (B) |
| [22] | Filed | June 19, 1969 | 3,167,276 | 1/1965 | Moosbrugger et al. ........ 244/77 (D) |
| [45] | Patented | July 13, 1971 | 3,252,675 | 5/1966 | Close et al. .................... 244/77 (E) |
| [73] | Assignee | The Bendix Corporation | | | |

Primary Examiner—Milton Buchler
Assistant Examiner—Jeffrey L. Forman
Attorneys—Anthony F. Cuoco and Plante, Hartz, Smith & Thompson

[54] AERIAL RECOVERY SYSTEM FOR AUTOPILOT/FLIGHT DIRECTOR SYSTEM
15 Claims, 8 Drawing Figs.

[52] U.S. Cl...................................................... 244/77 B,
244/77 D, 244/77 E
[51] Int. Cl.......................................................... B64c 13/18
[50] Field of Search............................................ 244/77, 77
B, 77 D, 77 E; 343/108

[56] References Cited
UNITED STATES PATENTS
2,952,405  9/1960  Guarino .................. 244/77 (B) X ABSTRACT: A flight control system whereby an automatic pilot, or human pilot through a flight director, controls the flight of an aircraft for accomplishing an aerial recovery mission by initially matching aircraft vertical velocity and position with vertical velocity and position of a falling target. Subsequently, fly-by or other loss of target is negated by the system and it directs the human or auto pilot in a controlled air mass turn and descent maneuver to bring the aircraft over the target.

INVENTOR.
ARTHUR SIMON

INVENTOR.
ARTHUR SIMON
BY
ATTORNEY

INVENTOR.
ARTHUR SIMON 3,592,417

AERIAL RECOVERY SYSTEM FOR AUTOPILOT/FLIGHT DIRECTOR SYSTEM

BACKGROUND OF THE INVENTION

1. Field of the Invention

This invention relates to flight control systems and, more particularly, to a flight control system for performing an aerial recovery mission to acquire and follow a falling target.

2. Description of the Prior Art

An aerial recovery mission to acquire and follow a falling target, such as a space capsule parachuting to earth, requires that the aircraft pass close to the target to minimize errors, fly a straight line course away from the target, make a prescribed bank angle and airspeed turn, and roll out on a radial vector toward the target. Pickup of the target is then achieved by longitudinal control of the craft.

Prior to the present invention there has not been a device for organizing these maneuvers to provide data so that an autopilot or human pilot can follow computed commands.

SUMMARY OF THE INVENTION

This invention contemplates a flight control system for controlling longitudinal and lateral flight of an aircraft to acquire and follow a falling target.

The longitudinal control channel combines a signal ($\dot{H}_a$) corresponding to actual vertical velocity of the aircraft with a signal ($\dot{H}_r$) corresponding to a reference vertical velocity. The combined signal is integrated and the integrated signal, the combined signal and a signal ($\dot{\theta}$) corresponding to aircraft pitch rate are combined. The last mentioned combined signal is modified by a signal corresponding to the versine of the aircraft roll angle $\Phi$ [$1-\cos \Phi$)] modulated by forward airspeed (V) and elevator position ($E_e$) feedback signals, and the modified combined signal is applied to an elevator servo loop for controlling aircraft elevators.

The lateral control channel commands the aircraft to a heading hold mode by combining a signal ($\psi_s$) corresponding to synchronized heading with roll angle ($\Phi$) to provide an error signal and combining the error signal with its integral. A programmed timer commands the craft to fly a precise turn radius and a precise roll angle by combining a signal (R) corresponding to the desired turn radius with a signal (tan $\Phi$) corresponding to the tangent of the roll angle. The combined signal is, in turn, combined with a signal ($V^2$) corresponding to the square of airspeed to provide an error signal, and this error signal and its integral are combined and applied to an aileron servo loop for controlling aircraft ailerons.

One object of this invention is to provide a system for controlling an aircraft to accomplish an aerial recovery mission.

Another object of this invention is to control the craft to acquire a target by matching aircraft vertical velocity and position with target vertical velocity and position.

Another object of this invention is to control lateral and longitudinal flight of the craft for acquiring the target.

Another object of this invention is to provide for automatic control of the craft, or for control of the craft by a human pilot through a flight director, for passing close to the target, flying a straight line course away from the target, making a prescribed bank angle and airspeed turn, rolling out on a radial vector toward the target and flying longitudinally to capture the target.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

DESCRIPTION OF THE INVENTION

LONGITUDINAL CONTROL CHANNEL

Figure 1:
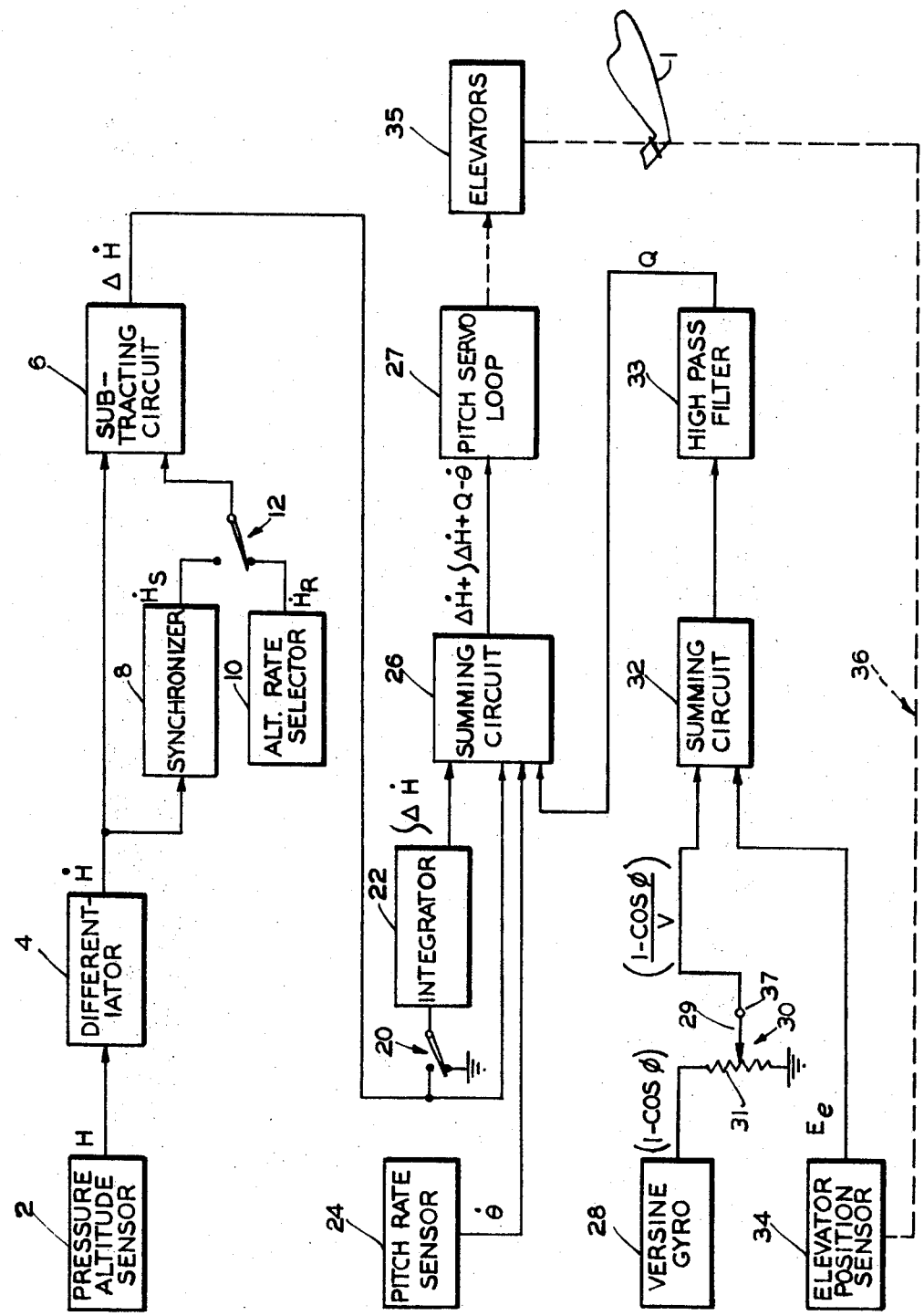
FIG. 1 is a block diagram showing apparatus for longitudinal control of an aircraft in accordance with the invention.

FIG. 1 shows a pressure altitude sensor 2 for providing a signal H corresponding to the actual altitude of an aircraft 1. Signal H is differentiated by a differentiator 4 and the differentiated signal $\dot{H}$ corresponding to actual vertical velocity or, in other words, altitude rate of aircraft 1, is synchronized by a synchronizer 8 for providing a synchronized vertical velocity signal $\dot{H}_s$. A pilot operated altitude rate selector 10 provides a signal $\dot{H}_r$ corresponding to a preselected reference altitude rate.

A subtracting circuit 6 subtracts signal $\dot{H}$ from either signal $\dot{H}_s$ from synchronizer 8 or signal $\dot{H}_r$ from altitude rate selector 10, as selected by the pilot and engaged through a selectively operated switch 12, and provides an altitude rate difference signal $\Delta\dot{H}$. Switch 12 is provided for selection of signals $\dot{H}_s$ or $\dot{H}_r$ to provide the pilot with the flexibility of selecting a predetermined altitude rate, if such information is available or, on the other hand, to use altitude rate derived from an on board sensor and synchronized to prevent transient commands from reaching the aircraft control surface.

Signal $\Delta\dot{H}$ is applied to a summing circuit 26 and is applied through a pilot operated switch 20 to an integrator 22 to eliminate long term turn errors. The integrated signal $\int \dot{H}$ is applied to summing circuit 26 as is a pitch rate signal $\dot{\theta}$ from a pitch rate sensor 24.

A versine gyro 28 provides a signal corresponding to the versine of aircraft roll angle $\Phi$, and which versine signal ($1-\cos \Phi$) is applied to a resistor element 31 of a potentiometer 30. Potentiometer 30 has an arm 29 which is arranged to move automatically as a function of the reciprocal of airspeed (V) of aircraft 1 so that there is provided at a pick off terminal 37 of potentiometer 30 a signal ($1-\cos \Phi$)/V.

An elevator position sensor 34 coupled by suitable mechanical means 36 to elevators 38 of aircraft 1 provides a feedback signal $E_e$ corresponding to the position of the elevators, and which signal $E_e$ is summed by a summing circuit 32 with signal ($1-\cos \Phi$)/V from potentiometer 30. The summed signal is applied to a high pass filter 33 which provides a quickening or damping and lead signal Q for increased stability. Signal Q is applied to summing circuit 26 and summed thereby with the signals from subtracting circuit 6 ($\Delta\dot{H}$), integrator 22 ($\int \Delta\dot{H}$) and pitch rate sensor 24 ($\dot{\theta}$) to provide a summation signal $\Delta\dot{H} + \int \Delta\dot{H} + Q - \dot{\theta}$. The summation signal is applied through a pitch servo loop 27 for operating elevators 38 of aircraft 1.

OPERATION OF LONGITUDINAL CONTROL CHANNEL

Figure 8:
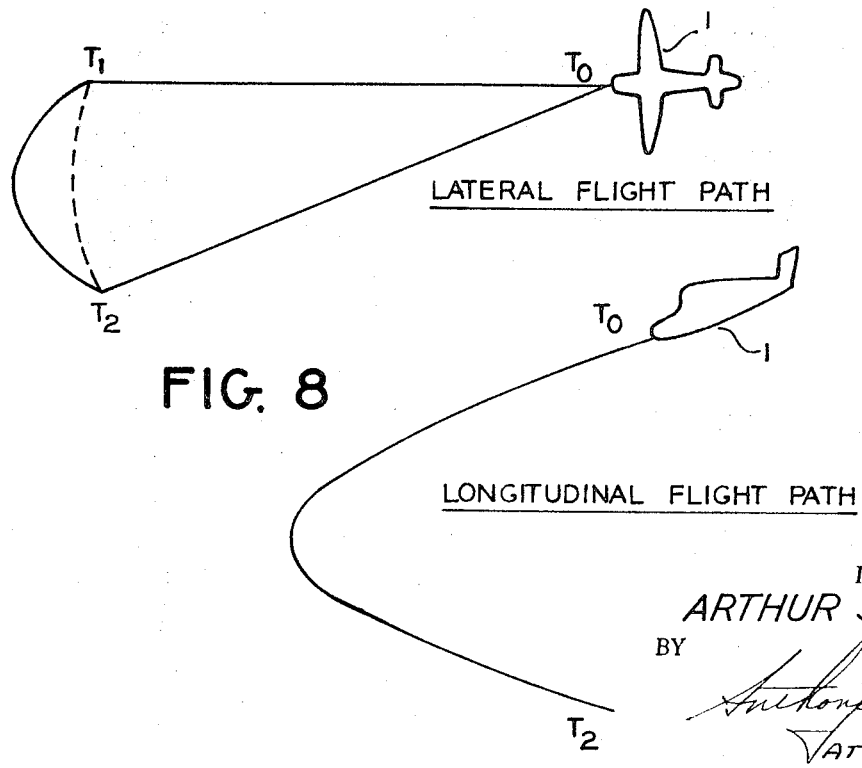
FIG. 8 is a diagrammatic representation showing longitudinal and lateral flight paths flown by the aircraft controlled in accordance with the invention.

Actual aircraft vertical velocity signal $\dot{H}$ and reference vertical velocity signal $\dot{H}_r$ or $\dot{H}_s$, as the case may be, are assumed to be correct at a time $T_o$, the target "Fly-By" time of aircraft 1, and which time $T_o$ is shown in the longitudinal flight path diagram of FIG. 8. The relative altitude separation of aircraft 1 from target; i.e. $H$ (aircraft) $- H$ (target), is also assumed to be correct at this time. At time $= T_o$, switch 20 is closed by the pilot enabling integrator 22 to integrate any deviation in signal ($\Delta H$) for maintaining relative target/aircraft position. Quickening or damping signal Q is provided when signal $(1-\cos \Phi)$ from versine gyro 28 is modulated by airspeed signal $1/V$ from potentiometer 30, and elevator position signal $E_e$ from elevator position sensor 34, and which versine, airspeed and elevator position signals are appropriately summed by summing circuit 32 and applied through high pass filter 33 so that on a short term basis, if aircraft 1 assumes an increased roll angle or looses forward speed, a corresponding immediate but temporary increase in "up elevator" is commanded.

Once elevators 38 are moved on a long term basis, signal $\Delta H$ assures the cancellation of relative vertical motion drift while the altitude rate signal $\dot H$ assures maintenance of correct aircraft vertical velocities. Only if the output of summing circuit 26 ($\Delta H + \int \Delta H + Q - \dot\theta$) is zero will aircraft 1 assume and hold zero relative position errors after time $T_o$. In this connection it is to be noted that the signal from pitch rate sensor 24 ($\dot\theta$) provides appropriate damping and lead characteristics to the summation signal as does signal $Q$ from filter 33.

LATERAL CONTROL CHANNEL

Figure 2:
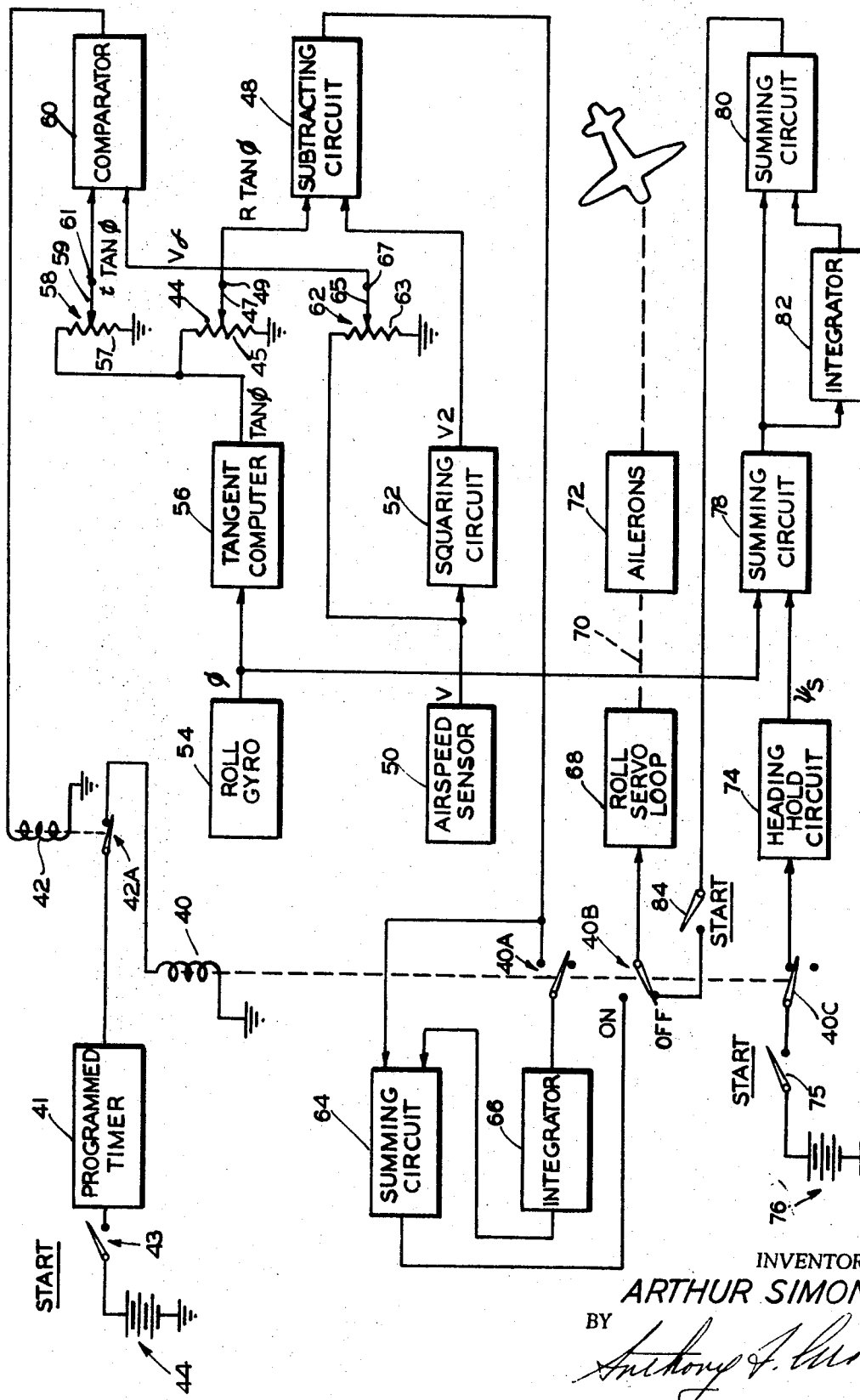
FIG. 2 is a block diagram showing apparatus for lateral control of the aircraft in accordance with the invention.

FIG. 2 shows a programmed timer 41 connected through a normally open, manually operated start switch 43 to a suitable source of direct current such as a battery 44. Programmed timer 41 is connected through a normally closed contact 42A of a relay 42 to energize a relay 40, and which relay 40 has a normally open contact 40A, a normally "off" contact 40B and a normally closed contact 40C. Upon deenergization of relay 40, contact 40A closes to connect an integrator 66 to a subtracting circuit 48, contact 40B is "on" and connects a summing circuit 64 to a roll servo loop 68 and when "off" upon energization of relay 40 connects through a start switch 84 a summing circuit 80 to roll servo loop 68, and contact 40C connects through a start switch 75 a suitable source of direct current such as a battery 76 to a heading hold circuit 74 when relay 40 is energized to close said contact 40C.

A roll gyro 54 provides a signal $\Phi$ corresponding to the roll angle of aircraft 1, and which signal $\Phi$ is applied to a tangent computer 56 for providing a signal $\tan \Phi$ corresponding to the tangent of the roll angle. Tangent computer 56 is connected to a resistor element 45 of a potentiometer 44, and which potentiometer has a manually adjustable arm 47 adjusted to a predetermined setting in accordance with a desired radius of turn R so that the output from potentiometer at a pickoff terminal 49 corresponds to $R \tan \Phi$. Tangent computer 56 is also connected to a resistor element 57 of a potentiometer 58 having an automatically adjustable arm 59 adjusted to a predetermined setting corresponding to time $t$ elapsed since starting the turn so that the output from potentiometer 58 at a pickoff terminal 61 corresponds to $t \tan \Phi$.

An airspeed sensor 50 provides a signal V corresponding to the airspeed of aircraft 1, and which signal V is squared by a squaring circuit 52 providing a signal $V^2$. Airspeed sensor 50 is connected to a resistor element 63 of a potentiometer 62, and which potentiometer has a manually adjustable arm 65 adjusted to a predetermined setting corresponding to the desired number of turn degrees $\alpha$ so that the output from potentiometer 62 at a pickoff terminal 67 corresponds to $V\alpha$.

Potentiometers 58 and 62 are connected to a comparator 60 which compares signals ($t \tan \Phi$) and $V\alpha$ from the potentiometers and energizes relay 42 when the signals are equal, and which equality occurs at time $T_2$ shown in FIG. 8. Energized relay 42 opens contact 42A thereof, whereupon relay 40 is deenergized, contact 40A closes, contact 40B is actuated to the "on" position and contact 40C is opened.

During the interval $T_1-T_2$ shown in FIG. 8, aircraft 1 is turning and relay 42 is energized. From $T_o-T_1$, aircraft 1 is flying in a heading hold mode and relay 40 is deenergized. From $T_2$ to target pickup, aircraft 1 is also flying in the heading hold mode. The implementation of the heading hold mode will be hereinafter explained.

Potentiometer 44 and squaring circuit 52 are connected to subtracting circuit 48 which subtracts the signals therefrom and provides an error signal which is applied to summing circuit 64 and through contact 40A when closed by deenergized relay 40 to an integrator 66. Integrator 66 is connected to summing circuit 64 which sums the integrated output and the output from subtracting circuit 48. The summed output from summing circuit 64 is applied through contact 40B when in the "on" position to a roll servo loop 68 for operating ailerons 72 of aircraft 1. Thus, from time $T_1-T_2$, aircraft 1 is controlled so that $V\gamma=R \tan \Phi$ is the roll command equation.

Heading hold circuit 74 is connected through closed switch contact 40C when relay 40 is energized and through a manually closed start switch 75 to battery 76 so as to be energized thereby with the output from heading hold circuit 74 being a synchronized heading hold signal $\psi_s$. Heading hold circuit 74 is connected to a summing circuit 78 as is roll gyro 54. Summing circuit 54 sums signals $\psi_s$ and $\Phi$, and the summed signal therefrom is applied to a summing circuit 80 and to an integrator 82. Summing circuit 80 sums the signal from summing circuit 78 and its integral from integrator 82 and the summed signal is applied through a manually closed start switch 84 and through contact 40B in the "off" position when relay 40 is energized to roll servo loop 68 for operating ailerons 72 of aircraft 1. Thus, the roll command equation is then $\psi_s-\Phi+\int (\psi_s-\Phi) dt$.

OPERATION OF LATERAL CONTROL CHANNEL

The configuration shown in FIG. 2 controls aircraft 1 to a heading hold mode when relay 40 is energized by summing synchronized heading signal $\psi_s$ and roll gyro signal $\Phi$, and then summing the summation signal provided thereby with its integral. Initially, relay 42 is deenergized and contact 42A is closed as shown in FIG. 2. Upon closing start switches 43, 75 and 84, programmed timer 41, at time $T_1$, energizes relay 40 through closed contact 42A, and aircraft 1 is commanded to fly a precise turn radius R and a precise roll angle $\Phi$.

The turn radius is established by the setting of potentiometer 44, and which potentiometer is energized by signal $\tan \Phi$ from tangent computer 56 to provide a signal $R \tan \Phi$. Squared airspeed signal $V^2$ is subtracted from signal $R \tan \Phi$ by subtracting circuit 48 to provide an initial error signal. The error signal and its integral are summed by summing circuit 64 and applied through roll servo loop 68 for controlling ailerons 72 of aircraft 1.

The turn angle is computed by applying signal $\tan \Phi$ from tangent computer 56 to resistor element 57 of potentiometer 58, and which potentiometer 58 has automatically adjusted arm 59 adjusted to a predetermined elapsed time setting $t$, whereby said signal is multiplied by the elapsed time ($t$) since the start of the turn (time $T_1$ in FIG. 8). The resulting signal $t \tan \Phi$ is then compared to signal $V\alpha$ from potentiometer 62. When signal $t \tan \Phi$ is equal to or greater than signal $V\alpha$, relay 42 is energized causing relay 40 to deenergize whereupon switch 40B goes to the "on" position.

Figure 3:
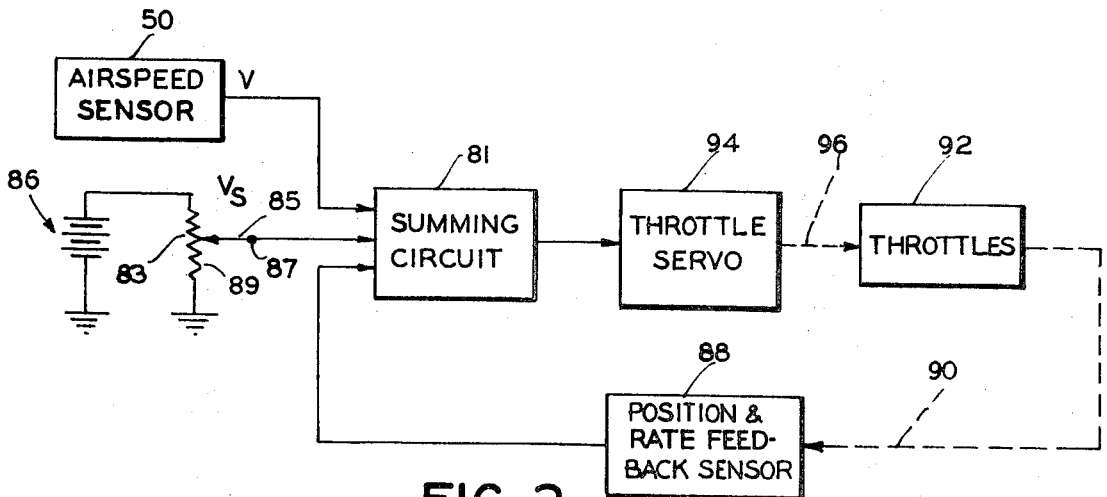
FIG. 3 is a block diagram showing an embodiment of the invention wherein an airspeed hold mode is implemented.

FIG. 3 shows an embodiment of the invention wherein the airspeed hold mode is actuated and maintained through a thrust (throttle position) loop. Thus, signal V from airspeed sensor 50 is applied to a summing circuit 81 and summed thereby with a preselected airspeed signal $V_s$ provided by a potentiometer 89 having a resistor element 83 connected to a suitable source of direct current such as a battery 86 and a manually adjustable arm 85 adjusted to the preselected airspeed setting so as to provide signal $V_s$ at a pickoff terminal 87, and with a feedback signal provided by a position and rate feedback sensor 88 connected by suitable mechanical means 90 to aircraft throttles 92. The output from summing circuit 81 is applied to a throttle servo 94 and therefrom through suitable mechanical means 96 to throttles 92 to implement the airspeed hold mode.

Figure 4:
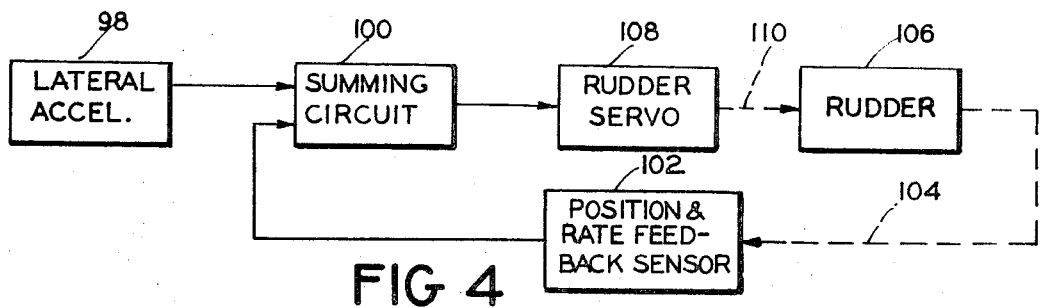
FIG. 4 is a block diagram showing an embodiment of the invention wherein turn coordination apparatus is implemented.

In order to assure proper turn coordination, a signal from a lateral accelerometer 98 is applied to control aircraft rudder 106 as shown in FIG. 4. Thus, accelerometer 98 is connected to a summing circuit 100 as is a position and rate feedback sensor 102, and which sensor 102 is connected by suitable mechanical means 104 to rudder 106 of aircraft 1. Summing circuit 100 sums the signals from accelerometer 98 and sensor 102, and the summation signal is applied through suitable mechanical means 110 to aircraft rudder 106 to provide the desired turn coordination.

ALTERNATE CONFIGURATION FOR LATERAL CONTROL CHANNEL

Figure 5:
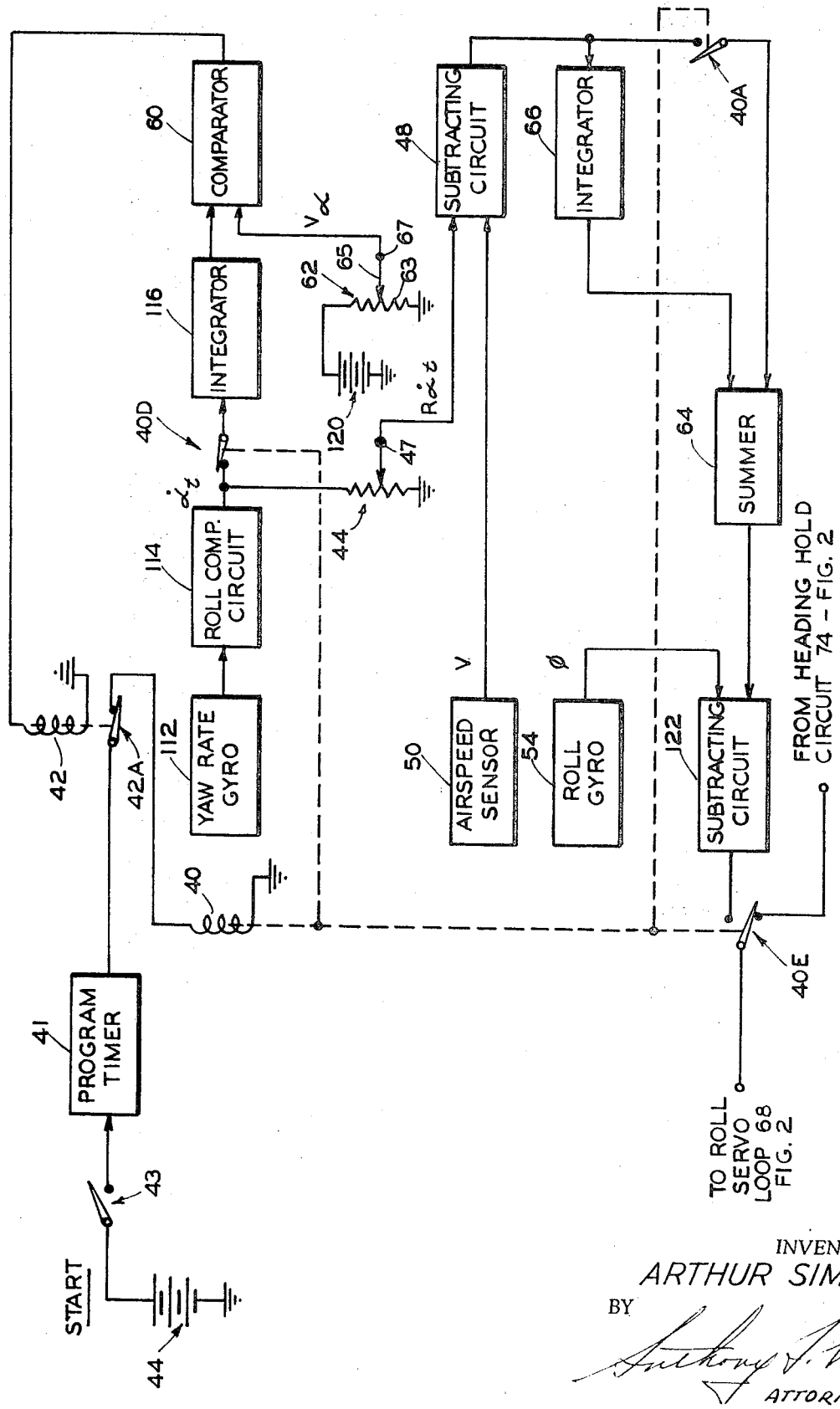
FIG. 5 is a block diagram showing an embodiment of the invention wherein the system shown in FIG. 2 is modified to accommodate large excursions from a desired air track.

The operation of relay 40 and the subsequent engagement of the lateral control channel shown in FIG. 2 may be accomplished by an alternate configuration such as that shown in FIG. 5. Thus, in FIG. 5 the output from battery 44 is applied to program timer 41 when switch 43 is closed to start the system. The output from timer 41 is applied through normally closed contact 42A of relay 42 to energize relay 40 whereupon contact 40A and a contact 40D thereof close and a contact 40E is operated to a position a for connecting heading hold circuit 74 shown in FIG. 2 to roll servo loop 68 also shown in FIG. 2.

A yaw rate gyro 112 provides a yaw rate signal, and which yaw rate signal is applied to a roll compensation circuit 114 for providing a signal ($\dot{\alpha}_t$) corresponding to the true rate of turn of aircraft 1. Roll compensation circuit 114 is connected through closed contact 40D to an integrator 116 and which integrator 116 is, in turn, connected to comparator 60.

Resistor element 63 of potentiometer 62 is connected to a battery 120 which provides an output in accordance with a preselected airspeed V and arm 65 is adjusted to a predetermined setting $\alpha$ so as to provide signal $V_\alpha$ at pickoff terminal 67 of potentiometer 62. Comparator 60 compares the output from integrator 116 with the output from potentiometer 62 and provides a difference output $$V = \int_0^\infty t_1 \alpha_t \, dt$$

for energizing relay 42 whereby contact 42A thereof opens and relay 40 is deenergized to close contacts 40A, open contact 40D and connect a subtracting circuit 122 to roll servo loop 68 shown in FIG. 2.

Potentiometer 44, energized by signal $\dot{\alpha}_t$ from roll compensation circuit 114 and having its arm 47 preset to a desired turn radius as heretofore noted provides an output R$\dot{\alpha}_t$ which is applied to subtracting circuit 48. Signal V from airspeed sensor 50 is applied to subtractor circuit 48, and which circuit subtracts the signals applied thereto with the difference signal provided thereby being applied to integrator 66 and through closed contact 40A to summing circuit 64. Summing circuit 64 sums the outputs applied thereto and the summation output therefrom is applied to subtracting circuit 122 which subtracts said summation output from signal $\Phi$ provided by roll gyro 54, and which summation output is applied to roll servo loop 68 shown in FIG. 2.

In the configuration of FIG. 5 the desired radius of turn is established through potentiometer 44, the output of which is multiplied by signal $\dot{\alpha}_t$ from roll compensation circuit 114 to obtain signal R$\dot{\alpha}_t$ at pickoff terminal 47 of the potentiometer. Subtracting circuit 48 compares this term to airspeed signal V from airspeed sensor 50 and the difference between the compared signals and the integral of the difference is used to control aircraft 1. The use of roll angle feedback as provided by roll gyro 54 nulls any error signal which may occur.

The true rate of turn ($\dot{\alpha}_t$) may be obtained from a platform mounted rate tyro or from a rate of turn (yaw) gyro with roll compensation as shown in FIG. 5, and wherein the roll compensation corrects for body mounting of the gyro. By integrating the true rate of turn and comparing it with the desired roll angle, relay 42 is energized when reaching the desired roll angle.

In the foregoing analysis of the invention it is assumed that aircraft 1 will deviate only slightly from a desired air track for preselected heading or preselected turn radius commands, i.e., it is assumed that the system has good response. If large excursions away from the desired air track are encountered, the path that the aircraft actually flies will be much longer and the preset elapsed time programmed into programmed timer 41 (FIGS. 2 and 5) will be too short.

Figure 6:
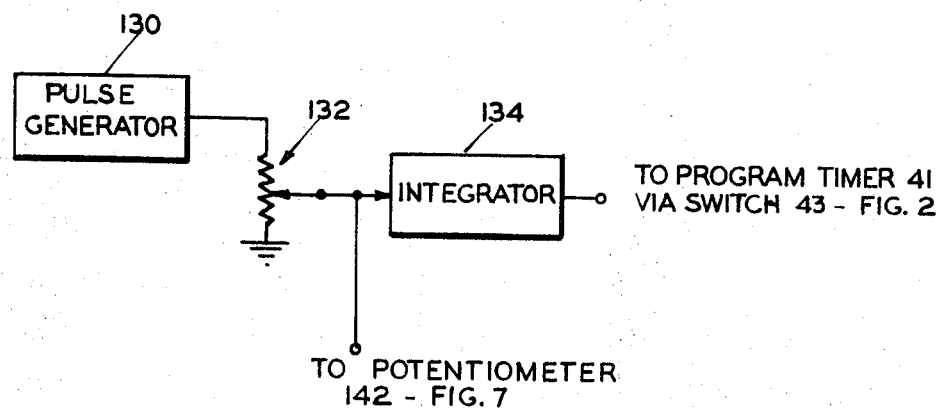
FIG. 6 is a block diagram showing an embodiment of the invention for proportioning elapsed time to accommodate large excursions from the desired flight path.

Apparatus for proportioning the elapsed time is shown in FIG. 6 wherein a pulse generator 130 provides a series of timing pulses which are applied through a compensating network or potentiometer 132 to an integrator 134 and therefrom to programmed timer 41 via switch 43 as shown in FIG. 2. The integrator output is thus proportional to the elapsed time as if no modification of its input were taking place.

If it is assumed that a straight line air track is to be held, then any deviation therefrom would cause air track stretching. By modifying the input to timer 40 by the cosine of the heading error angle the output of the integrator 134 is the elapsed time along the air track as if the craft had flown a perfect course. Similarly any lateral (heading) error can be used as an input modifier to obtain like results. This "effective" time along air track can be substituted to provide proper timing functions.

For a constant airspeed, the interval $T_0-T_1$, shown in FIG. 8 may be preset according to the length of path desired. For variable airspeeds, a simple computation achieved by the configuration shown in FIG. 7 will establish the correct path length.

Figure 7:
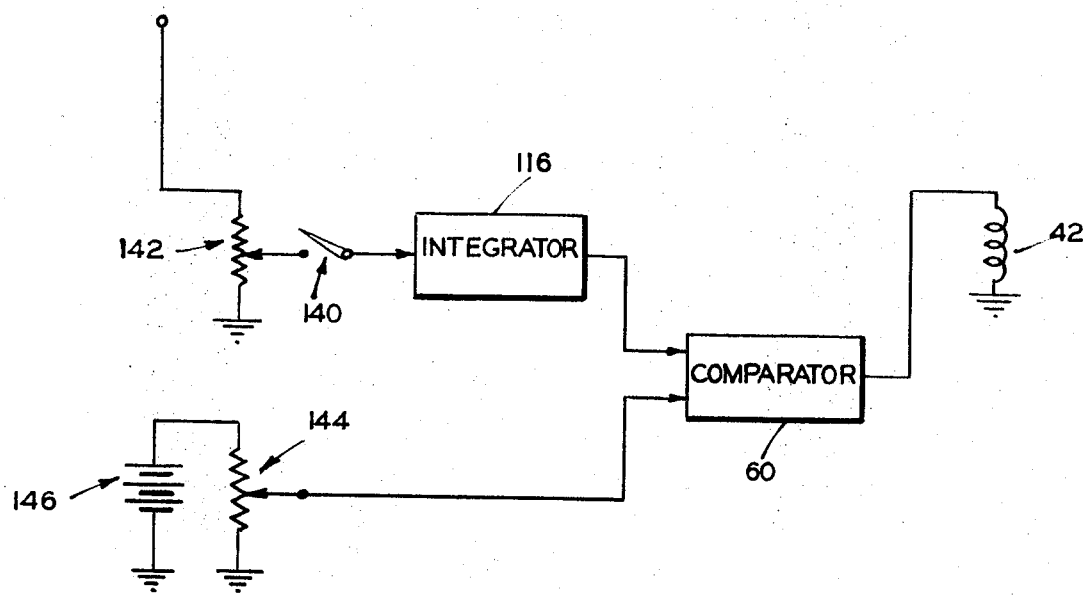
FIG. 7 is a block diagram showing an embodiment of the invention for accommodating variable airspeeds.

Thus, in FIG. 7 the output from potentiometer 132 shown in FIG. 6 is applied to a potentiometer 142 and therefrom through a normally open start switch 140 to integrator 116. A signal corresponding to the desired path length is provided by a potentiometer 144 energized by a suitable source of direct current shown as a battery 146. The output from integrator 116 and from potentiometer 144 are applied to comparator 60 and the output from comparator 60 operates relay 42 in a manner as heretofore described.

SUMMATION

The present invention provides means whereby an aerial recovery mission is accomplished; i.e., a falling target acquired by matching the vertical velocity and position of the aircraft with the vertical velocity and position of the target. Target acquisition is achieved by longitudinal and lateral control of the craft with the arrangement being such that the appropriate maneuvers are organized so that they may be displayed in a flight director or coupled to an autopilot for manual or automatic control of the craft.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. An aircraft control system comprising:
    means for providing an altitude displacement signal;
    means for providing a pitch rate signal;
    means for providing a signal corresponding to aircraft roll angle;
    means for providing an elevator position feedback signal;
    means for providing a first combined signal including means connected to the altitude displacement signal for providing an altitude rate signal, means for synchronizing the altitude rate signal, means for summing the altitude rate signal and the synchronized altitude rate signal for providing a difference signal, means for integrating the difference signal and means for combining the pitch rate signal, the difference signal and the integrated difference signal for providing said first combined signal;

means for combining the roll angle signal and the elevator position feedback signal for providing a second combined signal, and means connected to both of said signal combining means and responsive to the first and second combined signals therefrom for controlling the craft.

2. An aircraft control system as described by claim 1, including:

means for providing a heading displacement signal; and means connected to the heading displacement signal means and to the roll angle signal means and responsive to the signals therefrom for controlling the craft to fly in a heading hold mode, said means including means for summing the heading displacement signal and the roll angle signal, means for integrating the summation signal, means for summing the summation signal and the integrated summation signal and servo means for connecting the last mentioned signal means to a control surface for controlling the craft in the heading hold mode in response to the summation signal therefrom.

3. An aircraft control system as described by claim 1, including:

means for providing an airspeed signal;

means for providing a turn radius signal;

means for combining the turn radius and roll angle signals for providing a third combined signal;

means connected to the airspeed signal means and to the third combined signal means and responsive to the signals therefrom for providing an error signal; and means connected to the error signal means for controlling the craft to fly a predetermined roll angle and turn radius.

4. A flight control system as described by claim 3 wherein the means for combining the turn radius and roll angle signals for providing a third combined signal includes:

means connected to the roll angle signal means for providing a signal corresponding to the tangent of the roll angle; and the turn radius signal means is connected to the roll angle signal means for multiplying the signals therefrom to provide the third combined signal.

5. A flight control system as described by claim 4, including:

means connected to the roll angle tangent signal means for multiplying said tangent signal by a signal corresponding to a predetermined interval;

means connected to the airspeed signal means for multiplying said signal by a signal corresponding to a predetermined turn angle;

comparator means connected to both of said signal multiplying means for providing a signal corresponding to the difference between the signals therefrom; and switching means connected to the comparator means, to the heading displacement signal means and to the error signal means, and selectively operated by the signal from the comparator means for connecting one of the heading displacement and error signal means to the aileron control means.

6. A flight control system as described by claim 5, wherein the means connected to the error signal means for controlling the ailerons so that the aircraft flies a predetermined roll angle and turn radius includes:

an integrator for integrating the error signal; and summing means for summing the error signal and the integrated error signal.

7. A flight control system as described by claim 6, including:

switching means connected to the comparator means, the error signal means and the integrator, and selectively operated by the signal from the comparator means for connecting the error signal means to the integrator.

8. A flight control system as described by claim 5, including:

means for providing a yaw rate signal;

means connected to the yaw rate signal means for providing a rate of turn signal;

means for integrating the rate of turn signal;

said comparator means connected to the means for multiplying the airspeed signal by the rate of turn signal and connected to the integrator for providing a signal corresponding to the difference between the multiplied signal and the integrator signal;

means for providing a signal corresponding to the product of a predetermined turn radius and a predetermined rate of turn; means connected to the airspeed signal means and to the last mentioned means for subtracting the signals therefrom;

an integrator connected to the subtracting means;

summing means connected to the subtracting means and to the integrator for summing the signals therefrom;

means connected to the last mentioned summing means and to the roll gyro for subtracting the signals therefrom; and other switching means connected to the comparator means, to the heading displacement signal means and to the last mentioned subtracting means, and selectively operated by the signal from the comparator means for connecting one of said heading displacement and last mentioned subtracting means to the aileron control means.

9. A flight control system as described by claim 5, including:

timing means connected to the switching means for rendering said switching means effective after a predetermined interval for connecting the one of the heading displacement and error signal means to the aileron control means.

10. A flight control system as described by claim 9, including means for compensating for variable airspeeds comprising:

means for providing a signal corresponding to a desired flight path length;

said comparator being connected to the integrator and the desired flight path signal means for operating the switching means as a function of the difference between the signals therefrom.

11. A flight control system as described by claim 3, and including airspeed hold apparatus comprising:

means for providing a signal corresponding to a preselected airspeed;

sensing means coupled to an aircraft throttle for providing a throttle position and rate feedback signal;

means connected to the airspeed signal means, to the preselected air speed signal means and to the sensing means for combining the signals therefrom; and means for connecting the summing means to the throttle for operating said throttle in response to the combined signal.

12. A flight control system as described by claim 3, and including turn coordination apparatus comprising:

a lateral accelerometer for providing a lateral acceleration signal:

sensing means connected to an aircraft rudder for providing a rudder position and rate feedback signal;

means connected to the accelerometer and to the sensing means for summing the signals therefrom; and means for connecting the summing means to the rudder for operating said rudder in response to the summation signal.

13. A flight control system as described by claim 12, including apparatus for adjusting said predetermined interval to accommodate deviations from a desired air track comprising:

a pulse generator for providing a series of timing pulses;

means for integrating the timing pulses, and the timing means connected to the integrator for effecting a time interval in accordance with the integrated pulses.

14. A flight control system as described by claim 1, wherein the means for combining the roll angle signal and the elevator position feedback signal includes:

means for providing a signal corresponding to airspeed;

means connected to the roll angle signal means and to the airspeed signal means for dividing the roll angle signal by the airspeed signal;

means for summing the signal from the last mentioned means and the elevator position feedback signal for providing the second combined signal.

15. A flight control system as described by claim 1, including:
means for providing a signal corresponding to a predetermined altitude rate; and
switching means connected to the predetermined rate signal means and to the synchronized altitude rate signal means, and selectively operated to connect one of said signal means to the summing means.